United States Patent

[11] 3,551,767

| [72] | Inventor | Fukuo Shibata<br>13 Tokiwa-cho, Nishinomiya, Japan |
| --- | --- | --- |
| [21] | Appl. No. | 832,550 |
| [22] | Filed | May 21, 1969<br>Division of Ser. No. 624,119, Mar. 14,<br>1970, Patent No. 3,531,701. |
| [45] | Patented | Dec. 29, 1970 |
| [32] | Priority | Mar. 14, 1966, Mar. 31, 1966 |
| [33] | | Japan |
| [31] | | 41/16,008 and 41/20,320 |

[54] ELECTRIC CONTROL SYSTEM FOR INDUCTION MACHINE CONTAINING WINDING ELEMENTS OF TWO WOUND ROTOR INDUCTION MACHINES
10 Claims, 3 Drawing Figs.

[52] U.S. Cl. ................................................. 318/197,
318/45, 318/237
[51] Int. Cl. ..................................................... H02p 7/36
[50] Field of Search ............................................ 318/45, 49,
50, 197, 225, 237

[56] References Cited
UNITED STATES PATENTS

| 2,201,006 | 5/1940 | Kilgore | 318/197X |
| 2,355,727 | 8/1944 | Holters | 318/197X |
| 3,327,189 | 6/1967 | Hedstrom | 318/237X |

Primary Examiner—Oris L. Rader
Assistant Examiner—Gene Z. Rubinson

ABSTRACT: In an induction machine arrangement having elements of two wound rotor induction machines which contains two stator windings and two rotor windings rotating mechanically together with each other, the two stator windings are embedded in slots of one stator, and the two rotor windings are embedded in slots of one rotor, further controlled rectifiers are connected electrically between terminals of the two rotor windings; whereby are obtained a control system of a wide speed range when operating as a motor and a constant frequency control system when operating as a generator.

PATENTED DEC 29 1970

Inventor Fukuo Shibata

ELECTRIC CONTROL SYSTEM FOR INDUCTION MACHINE CONTAINING WINDING ELEMENTS OF TWO WOUND ROTOR INDUCTION MACHINES

This is a division of application Ser. No. 624,119 filed Mar. 14, 1967 now Pat. No. 3,531,701.

This invention relates to electric control systems for induction machines. An induction machine is an asynchronous alternating current machine which comprises a magnetic circuit interlinked with two electric circuits, or sets of circuits, rotating with respect to each other and in which power is transferred from one circuit to another by electromagnetic induction. Examples of induction machines are induction motors, induction generators and certain types of frequency converters and phase converters.

More particularly, the invention is concerned with the control system of speed for induction machines, such as induction motors, over a wide range by employing rectifiers. Further, the invention is concerned with the control system for an induction machine operating as a generator by employing rectifiers.

In the control of induction machines by rectifiers, it is important to provide control systems by which the induction machines can be controlled as motors over wide speed ranges without sacrificing efficiency of operation, torque or economy of apparatus of the systems.

Heretofore, various arrangements have been devised which permit the control of induction motors by employing rectifiers which are electrically connected with the rotor or secondary windings of the induction motors. In general, the electric power taken from the rotor or secondary windings is either fed back to the AC source or fed to the main shaft of the induction motors. When it is fed back to the AC source, in the prior arrangements, torque or efficiency of operation is not so large in case of comparatively low speed control range, because a large part of the electric energy supplied on the input terminals of the induction motor is fed back to the AC source and is not converted into the mechanical torque.

When the electric power taken from the rotor is fed to the main shaft of the induction motor by using a direct current motor in the prior method, the efficiency of operation or economy of apparatus of the system is rather reduced.

It is one of the objects of this invention to provide a speed control system by which the induction machine can be controlled when acting as a motor over a wide speed range without sacrificing efficiency of operation, torque or economy of apparatus of this system.

In the control of induction machines it is important to provide control systems by which the induction machines can be controlled as brushless type motors or generators. It is another object of this invention to make a brushless type controllable induction machine acting as a motor or a generator.

In the control of frequencies of generators it is important to keep constant frequencies of generators which are driven by prime movers at speeds not always constant. So, it is further another object of this invention to provide a simple control system keeping a constant frequency of a generator which is driven by a prime mover at speed not always constant.

It is still another important object of this invention to provide a speed control system of very simple construction by which the induction machine can be controlled over wide speed range without sacrificing efficiency of operation.

This invention possesses many other advantages, and has other objects which may be made more clearly apparent from a consideration of several embodiments of this invention. For this purpose, there are shown a few forms in the drawings accompanying and forming part of the present specification. These forms will now be described in detail, illustrating the general principles of this invention, but it is to be understood that this detailed description is not to be taken in a limiting sense, since the scope of the invention is best defined by the appended claims.

Referring to the drawings.

The machine arrangement according to the invention comprises the following combination: two electric polyphase windings called a first winding and a second winding which are coupled electromagnetically with respect to each other and rotating with respect to each other; controlled rectifiers which are inserted and connected electrically between the terminals of the said second winding and the terminals of the said fourth winding; wherein the first winding and the third winding are embedded in slots of one stator, and the second winding and the fourth winding are embedded in slots of one rotor; further, the first winding is so connected electrically with the third winding that the phase sequence of the connection of the first winding is opposite to the phase sequence of the connection of the third winding.

Figure 1:
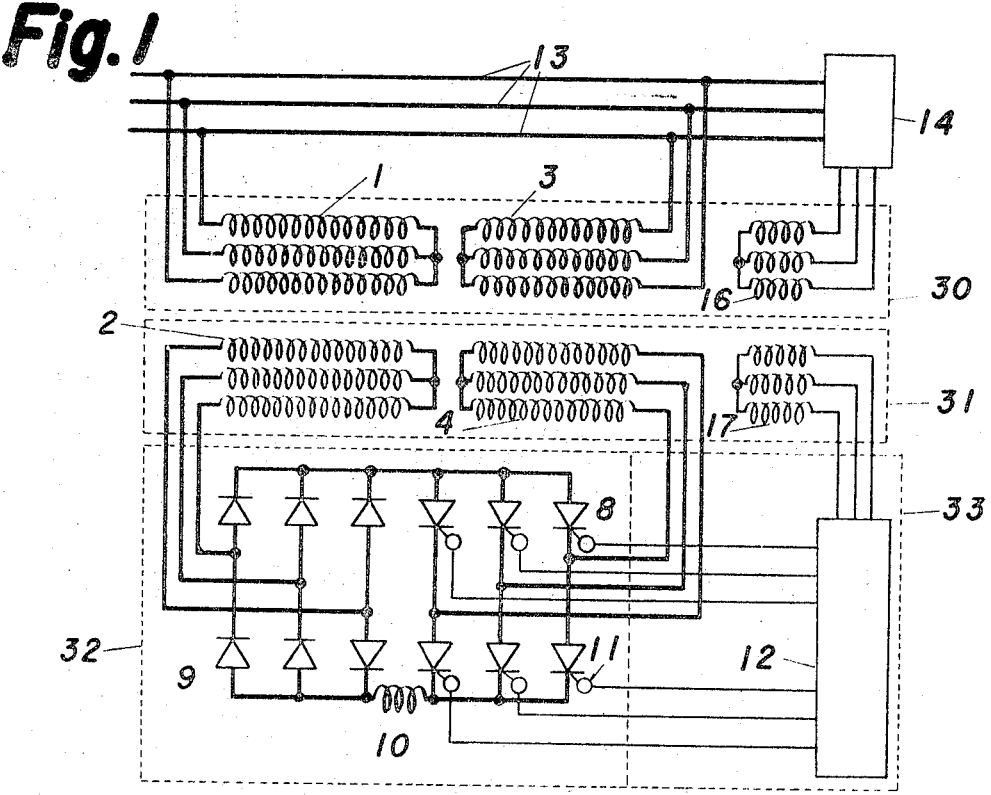
FIGS. 1 and 2 are system diagrams illustrating different forms of this invention, the systems being adapted to utilize any multiphase or single phase electrical energy, all represented by three phase lines on these diagrams.

In FIG. 1, two electric windings coupled electromagnetically with respect to each other are shown. These are; a first winding 1 and a second winding 2. These two electric windings 1 and 2 are coupled electromagnetically with respect to each other, and are arranged for rotating with respect to each other. Further, other two electric windings are shown in FIG. 1. These are a third winding 3 and a fourth winding 4. These two electric windings 3 and 4 are also coupled electromagnetically with respect to each other, and are arranged for rotating with respect to each other. The second winding 2 is in general embedded in slots on the surface of the rotor. The fourth winding 4 is also embedded in slots on the surface of the rotor. The second winding 2 and the fourth winding 4 are contained within one rotor. The first winding 1 and the third winding 3 are also contained within one stator. The first winding 1 is embedded in slots on the surface of the stator, and the third winding 3 is also embedded in slots on the surface of the stator. Thus, the second winding 2 rotates mechanically together with the fourth winding 4. Controlled rectifiers 8 are connected electrically between the terminals of the second winding 2 and the terminals of the fourth winding 4. In FIG. 1, a rectifying device 9 is further provided and is connected electrically between the terminals of the second winding 2 and the controlled rectifiers 8 in order to obtain direct current. Therefore, the controlled rectifiers 8 are connected electrically between the direct current terminals of the rectifying device 9 and the fourth winding 4. A reactor 10 is connected between a direct current terminal of the rectifying device 9 and a terminal of the controlled rectifiers 8. Each control electrode or gate 11 of the controlled rectifiers 8 is supplied with the control signal from the firing circuit 12 for controlling the power fed from the direct current output of the rectifying device 9 to the fourth winding 4. A group of diode rectifiers is shown in FIG. 1 as an example of a rectifying device 9. In many cases, semiconductor rectifiers are used as diode rectifiers and as controlled rectifiers 8.

In FIG. 1, the terminals of the first winding 1 are connected electrically with the terminals of the third winding 3. When the alternating current bus 13 is supplied from an alternating current source, the first winding 1 and the third winding 3 are supplied with an alternating current from the alternating current source. The firing circuit 12 of each gate 11 of the controlled rectifiers 8 is supplied with electric energy from the alternating current bus 13 through a phase shift control device 14 and an induction machine system which consists of a stationary winding 16 and a rotor winding 17. These two electric windings 16 and 17 called a fifth winding 16 and a sixth winding 17, are coupled electromagnetically with respect to each other and are arranged for rotating with respect to each other. The stationary fifth winding 16 is connected electrically with the alternating current bus 13 through the phase shift control device 14. The rotary sixth winding 17 is connected electrically with the firing circuit 12. The sixth winding 17 is mechanically coupled with the fourth winding 4. Therefore, the sixth winding 17 rotates together with the fourth winding 4.

When the alternating current bus 13 is supplied with electric energy from the alternating current source, the first winding 1, the third winding 3 and the fifth winding 16 are supplied with electric current from the alternating current bus 13. So, the rotating fields are produced in the stator and the rotor. We can arrange so that the direction of the rotation of the rotating field made by alternating current flowing in the first polyphase winding 1 is opposite to the direction of the rotation of the rotating field made by alternating current flowing in the third polyphase winding 3. In this case, the first winding 1 is so connected electrically with the third winding 3 that the phase sequence of the connection of the first winding 1 is opposite to the phase sequence of the connection of the third winding 3. The directions of the rotation of the second winding 2, the fourth winding 4 and the sixth winding 17 are same with respect to each other.

In FIG. 1, a direct current taken from the output terminals of the rectifying device 9 is fed to the fourth winding 4 through the controlled rectifiers 8 and the reactor 10. Therefore, the controlled rectifiers 8 with the firing circuit 12, the phase shift control device 14 and the induction machine system consisting of the fifth winding 16 and the sixth winding 17 operate as a separate excitation type inverter. The frequency of the control signal in the firing circuit (gate control circuit) 12 obtained from the alternating current bus 13 through the phase shift control device 14 and the induction machine system consisting of the fifth winding 16 and the sixth winding 17 matches with the frequency of the current through the terminals of the fourth winding 4 or of the controlled rectifiers 8, because the sixth winding 17 rotates together with the fourth winding 4 or the sixth winding 17 is arranged for coupling mechanically with the fourth winding 4, therefore the frequency of the voltage at the terminals of the sixth winding 17 is equal to that of the fourth winding 4. Thus the fourth winding 4 is supplied from the controlled rectifiers 8 having the same output frequency as the fourth winding 4.

The fourth winding 4 rotates in the third winding 3 in the region $s$ (slip) >1, so that the fourth winding 4 revolves against the rotating field, when the direction of the rotation of the rotating field made by alternating current flowing in the third polyphase winding 3 is opposite to the direction of the rotation of the rotating field made by alternating current flowing in the first polyphase winding 1. In this case, the controlled rectifiers 8 work at a higher frequency than that of the alternating current bus 13. Part of the slip power supplied from the controlled rectifiers 8 to the fourth winding 4 is fed back to the alternating current bus 13. A part of the electric power supplied from the alternating current bus 13 to the first winding 1 is converted into the mechanical power of the rotor containing the second winding 2, and another part of the electric power supplied from the alternating current bus 13 to the first winding 1 is fed to the fourth winding 4 through the second winding 2, the rectifying device 9, the reactor 10 and the controlled rectifiers 8. Thus, the mechanical power of the rotor owing to the fourth winding 4 can be added to the mechanical power of the rotor owing to the second winding 2 when the machine operates as a motor. The mechanical power of the rotor owing to the second winding 2 or that of the rotor owing to the fourth winding 4 is converted from the electric power which is absorbed from the electric power flow between the first winding 1 to the third winding 3 through the second winding 2, the rectifying device 9, the controlled rectifiers 8 and the fourth winding 4. With mechanical and inverter power limitations, the device permits continuous speed control from zero to the maximum speed near to the synchronous speed of the second winding 2. The speed of the rotor of the second winding 2 rotating together with the fourth winding 4 can be controlled by the control of the phase shift control device 14. The phase shift control device 14 can be inserted between the sixth winding 17 and the firing circuit 12 of the controlled rectifiers 8. Generally, the number of poles made by the first winding 1 must be the same as that made by the second winding 2, and the number of poles made by the third winding 3 must be the same as that made by the fourth winding 4.

Figure 3:
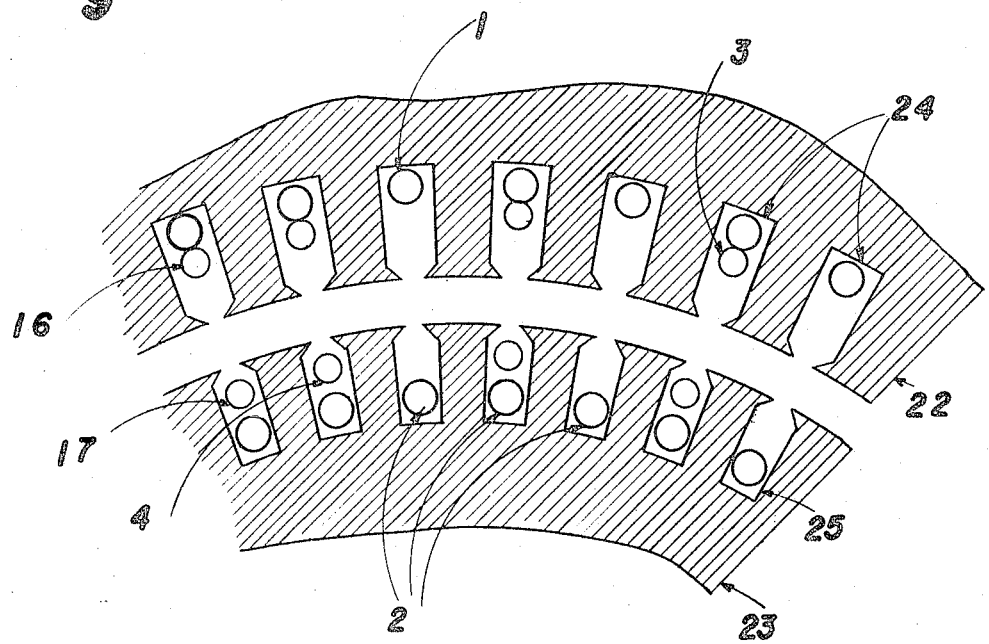
FIG. 3 shows a section of a part of a construction according to this invention.

In the arrangement of this invention, the first 1 and the third 3 windings are together in one stator, and the second 2 and the fourth 4 windings are embedded in one rotor. FIG. 3 shows an example of a section of a part of a stator and a rotor. In FIG. 3, the first winding 1 and the third winding 3 are embedded in slots 24 of one stator 22, and the second winding 2 and the fourth winding 4 are embedded in slots 25 of one rotor 23. In this case, the magnetic flux made by the current in the first winding 1 passes through the same stator 22 and rotor 23 cores that the magnetic flux made by the current in the third winding 3 passes through.

As the first and the third windings 1 and 3 are embedded together in slots of one stator, and the second winding 2 and the fourth winding 4 are embedded together in slots of one rotor, the number of poles made by the first winding 1 must be different from that made by the third winding 3. In that case, the most favourable ratio between the number of poles made by the first winding 1 and that made by the third winding 3 is $2m$ or $1/2n$, where $m$ and $n$ are integral numbers. In that case, there will not be produced a force between the first winding 1 and the fourth winding 4, and not be produced a force between the second winding 2 and the third winding 3.

Figure 2:
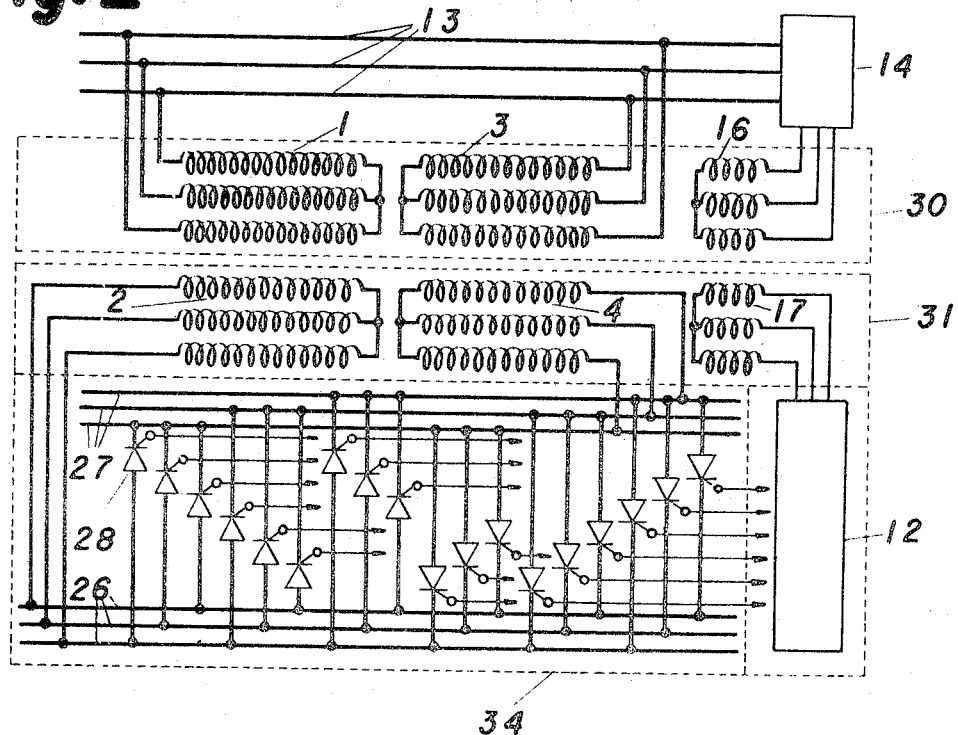

The difference between FIG. 2 and FIG. 1 is as follows: In FIG. 2, the terminals 26 of the second winding 2 are connected to the terminals 27 of the fourth winding 4 through eighteen controlled rectifiers 28. These controlled rectifiers are divided into two groups, the anodes and cathodes of one group being connected respectively to the terminals of the second winding 2 and of the fourth winding 4, and the anodes and cathodes of the other group being connected respectively to the terminals of the fourth winding 4 and of the second winding 2. The speed of the machine may be accurately controlled as a motor by means of a grid or gate control of the controlled rectifiers 28.

In operation, only the rectifier having the highest anode-cathode voltage can conduct at any one instant, and the portion of a cycle during which a rectifier is conducting is controlled by means of a voltage supplied to the control grid or gate. The control grids or gate of the individual rectifiers are supplied from the control unit or the firing circuit 12. A phase shift control device 14 is coupled electrically to the control unit or firing circuit 12 through the fifth winding 16 and the sixth winding 17 for the purpose of shifting the phase of the supplied grid or gate voltage with respect to the alternating current supply in dependence upon a control signal supplied to the phase shift control device 14.

Thus the controlled rectifiers 28 permit power to be fed into the fourth winding 4 from the second winding 2, and the amount of power fed into the fourth winding 4 may be varied between almost zero and a maximum value by suitable variation of the control signal. Control of the machine is as follows. The torque of the rotor owing to the second winding 2 is directly proportional to the current flowing in the second winding 2, and this current is clearly a function of the e.m.f. induced in the second winding 2 and the amount of power fed into the fourth winding 4 from the second winding 2. The amount of power fed from the second winding 2 to the fourth winding 4 is controlled by the phase shift control device 14 in dependence upon the supplied control signal so as to vary the fraction of each cycle during which each rectifier conducts.

An important advantage of the arrangement of FIG. 2 is that even a commutation failure during feed of power will not lead to a short circuit because it is restricted to one phase of the rotor circuit, and the arc which has not been extinguished during commutation will be extinguished automatically at the end of the rectification period. If the minimum slip frequency of the second winding is one cycle per second, then the maximum duration of any over current due to commutation failure will be limited to less than one-half second, and during normal operation with greater slip this time would be considerably less.

FIG. 1 shows one example of the wiring diagram of this invention. In FIG. 1, the first winding 1, the third winding 3 and the fifth winding 16 are in the stator part 30. The second winding 2, the fourth winding 4 and the sixth winding 17 are in the rotor part 31. What FIG. 1 means is shown in the following examples. (1) The first winding 1, the third winding 3 and the fifth winding 16 are embedded in slots on one stator, and the second winding 2, the fourth winding 4 and the sixth winding 17 are embedded in slots of one rotor, as shown in FIG. 3. (2) The first winding 1 and the third winding 3 are embedded in slots of one stator, and the second winding 2 and the fourth winding 4 are embedded in slots of one rotor. The fifth winding 16 is in another stator core and the sixth winding 17 is in another rotor core.

In FIG. 1, it is shown that the rectifying device 9, the reactor 10 and the controlled rectifiers 11 form a unit 32 which is connected electrically between the second winding 2 and the fourth winding 4. This unit 32 can be either stationary or rotary. If it is installed in a static position outside the rotary part, it is necessary to provide sliprings on the terminals of the second winding 2 and the fourth winding 4 for connecting these windings 2 and 4 with the unit 32. If the unit 32 and the grid or gate control part 33 containing the firing circuit 12 are arranged for rotating together with the second, the fourth and the sixth windings 2, 4, 17, it is not necessary to provide sliprings on the terminals of these windings 2, 4, 17. In that case, the controlled rectifiers 8 can be mechanically clamped or coupled with the rotor shaft around which the controlled rectifiers 8 are mechanically driven together with the second, the fourth and the sixth windings 2, 4, 17.

In FIG. 2, the unit 34 contains controlled rectifiers 28 which are connected in place of the combination of the controlled rectifiers 8 with the rectifying device 9 in FIG. 1. These controlled rectifiers 28 of FIG. 2 can also be coupled mechanically with the rotor shaft.

Until now, we have mainly considered that induction machines containing the first, second, third and fourth windings in this invention can be driven as motors. However, the induction machines in this invention can be used also as induction generators. If the rotor containing the second winding 2 is driven at a speed more than its synchronous speed by a prime mover, the induction machine operates as an induction generator. In this case, the synchronous speed (r.p.m.) of the second winding 2 means the speed obtained from the following formula, $$(\text{r.p.m.}) = \frac{f \times 120}{p} \quad (1)$$

where $p$ is the number of poles of the first or the second winding, and $f$ is frequency of the alternating current bus 13.

In this case, if the alternating current bus 13 is supplied with electric power from the other alternating current source, the exciting current of the induction machine can be supplied from the alternating current source (not shown in the FIG.).

If there is no alternating current source other than the induction machine, the exciting current of the induction generator can be supplied from the third winding 3 through the alternating current bus 13. Ordinarily, an electromagnetic system composed of electric windings 3 and 4 is driven at a speed less than its synchronous speed, when the induction machine system composed of electric windings 1 and 2 operates as an induction generator. If the induction generator system composed of electric windings 1 and 2 is supplied with exciting current only from the electromagnetic system of electric windings 3 and 4, the frequency of the alternating current bus 13 can be controlled by the control of the phase shift control device 14.

I claim:
1. An induction machine arrangement comprising in combination: two electric polyphase windings called a first winding and a second winding which are coupled electromagnetically with respect to each other and rotating with respect to each other; other two electric polyphase windings called a third winding and a fourth winding which are coupled electromagnetically with respect to each other and rotating with respect to each other; controlled rectifiers which are inserted and connected electrically between the terminals of the said second winding and the terminals of the said fourth winding; wherein the first winding and the third winding are embedded in slots of one stator, and the second winding and the fourth winding are embedded in slots of one rotor; further, the first winding is so connected electrically with the third winding that the phase sequence of the connection of the first winding is opposite to the phase sequence of the connection of the third winding.

2. The combination as set forth in claim 1, in which further two electric windings called a fifth and a sixth windings coupled electromagnetically with respect to each other and rotating with respect to each other; the said sixth winding is connected electrically for supplying a firing circuit of the controlled rectifiers with electric power; the said firing circuit is connected to each gate or control element of the controlled rectifiers; and means is provided for rotating mechanically the said sixth winding together with the said fourth winding.

3. The combination as set forth in claim 2, in which the first, third and fifth windings are embedded in one stator; and the second, fourth and sixth windings are embedded in one rotor.

4. The combination as set forth in claim 1, in which the number of poles made by the first winding is different from that made by the third winding.

5. The combination as set forth in claim 4, in which the ratio between the number of poles made by the first winding and that made by the third winding is 2 or one-half.

6. The combination as set forth in claim 1, in which a rectifying device is connected electrically between the terminals of the second winding and the controlled rectifiers in order to obtain a direct current therefor, the controlled rectifiers being connected electrically between the direct current terminals of the said rectifying device and the fourth winding, whereby each control electrode or gate of the controlled rectifiers is supplied with the control signal from the firing circuit for controlling the power fed from the direct current output of the said rectifying device to the fourth winding.

7. The combination as set forth in claim 1, in which the controlled rectifiers are divided into two groups, the anodes and cathodes of one group being connected respectively to the terminals of the second winding and of the fourth winding, and the anodes and cathodes of the other group being connected respectively to the terminals of the fourth winding and of the second winding.

8. The combination as set forth in claim 1, in which a phase shift control device is electrically connected between the sixth winding and the firing circuit of the controlled rectifiers.

9. The combination as set forth in claim 1, in which a phase shift control device is electrically connected with the fifth winding.

10. The combination as set forth in claim 1, in which the controlled rectifiers are mechanically coupled or clamped with the rotor shaft around which the controlled rectifiers are mechanically driven together with the second, the fourth and the sixth windings.